(12) United States Patent
Briancourt et al.

(10) Patent No.: US 8,235,326 B2
(45) Date of Patent: Aug. 7, 2012

(54) AIRCRAFT LANDING GEAR LOAD SENSOR

(75) Inventors: Stephen Briancourt, Bristol (GB); Trajan Seymour, Bristol (GB)

(73) Assignee: Airbus Operations Limited, Bristol (GB)

( * ) Notice: Subject to any disclaimer, the term of this patent is extended or adjusted under 35 U.S.C. 154(b) by 702 days.

(21) Appl. No.: 12/216,195

(22) Filed: Jul. 1, 2008

(65) Prior Publication Data

US 2009/0026313 A1    Jan. 29, 2009

(30) Foreign Application Priority Data

Jul. 26, 2007 (GB) .................................. 0714546.9

(51) Int. Cl.
*B64C 25/52* (2006.01)

(52) U.S. Cl. .................. 244/100 R; 244/102 R; 73/808; 340/960

(58) Field of Classification Search ............. 244/100 R, 244/117 R, 104 R, 63, 104 FP; 73/579, 862.041; 340/960
See application file for complete search history.

(56) References Cited

U.S. PATENT DOCUMENTS

| | | | | |
|---|---|---|---|---|
| 4,637,574 A * | 1/1987 | Handwerk | ............ | 244/104 FP |
| 6,840,114 B2 | 1/2005 | Niezgorski et al. | | |
| 7,578,199 B2 * | 8/2009 | Giazotto | ...................... | 73/800 |
| 2002/0063866 A1 | 5/2002 | Kersey et al. | | |
| 2007/0006652 A1 * | 1/2007 | Weldon et al. | .................. | 73/579 |
| 2007/0090281 A1 * | 4/2007 | Coleman | .................. | 250/227.14 |

FOREIGN PATENT DOCUMENTS

| | | |
|---|---|---|
| EP | 1 677 091 | 7/2006 |
| EP | 1677091 A1 * | 7/2006 |
| GB | 2 421 075 | 6/2006 |
| WO | 2005/022098 | 3/2005 |
| WO | WO 2006/064181 | 6/2006 |
| WO | WO 2007/021751 | 2/2007 |

OTHER PUBLICATIONS

Munns, T. E. et al., "Health Management Technologies and Experiments for Transport Aircraft Landing Gear", AIAA Guidance, Navigation, and Control Conference 2005, pp. 1-7, (Aug. 18, 2005).
Great Britain Search Report for GB Application No. 0714546.9, dated Oct. 2, 2007.

* cited by examiner

*Primary Examiner* — Timothy D Collins
*Assistant Examiner* — Medhat Badawi
(74) *Attorney, Agent, or Firm* — Nixon & Vanderhye P.C.

(57) ABSTRACT

An aircraft landing gear comprising a fibre optic load sensor for monitoring load in a component of the landing gear, such as an axle. The fibre optic cable is mounted on an inner surface of the component of the landing gear. Typically the fibre optic load sensor comprises one or more Bragg Grating sensors.

8 Claims, 1 Drawing Sheet

FIGURE 1
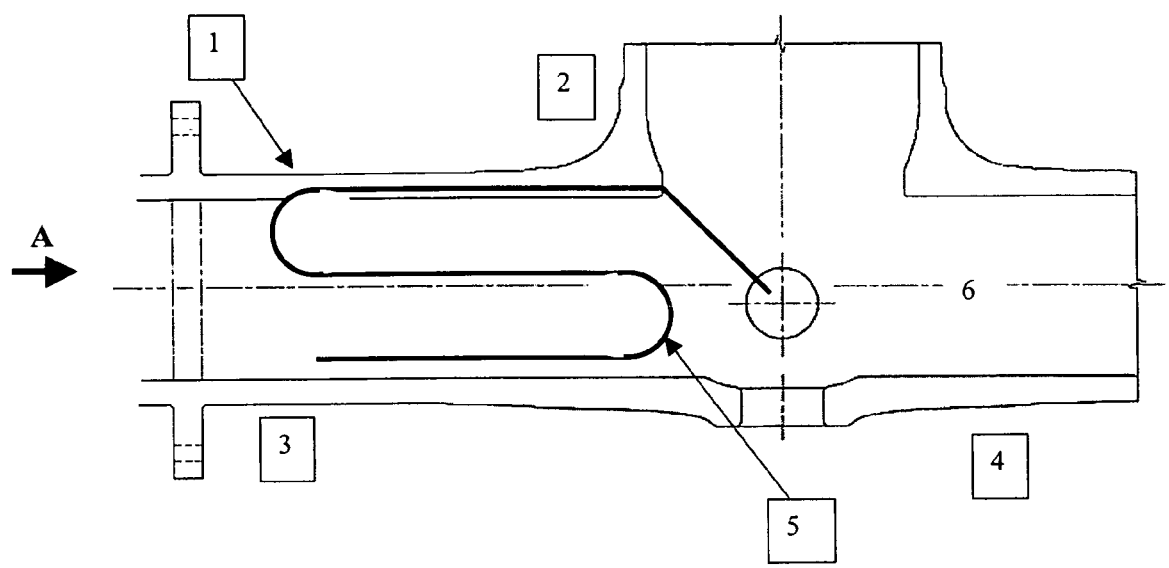
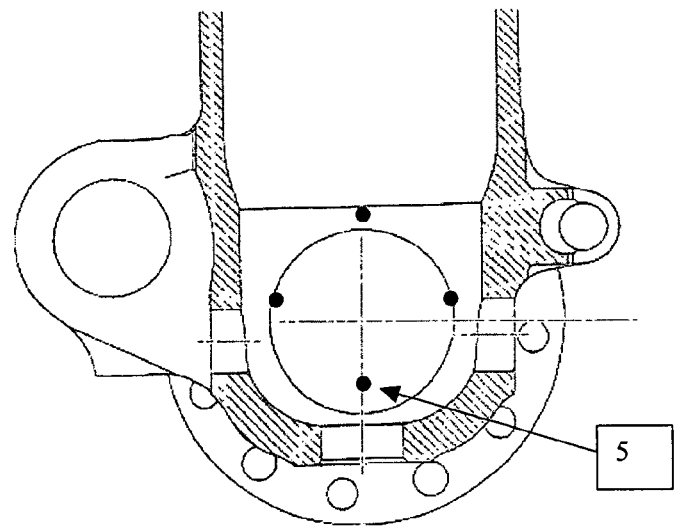
FIGURE 2

AIRCRAFT LANDING GEAR LOAD SENSOR

This application claims priority to Great Britain Application No. 0714546.9, filed Jul. 26, 2007, the entire contents of each of which are hereby incorporated by reference.

FIELD OF THE INVENTION

The present invention relates to a system for measuring load in an aircraft landing gear.

BACKGROUND OF THE INVENTION

There is a need to know the loads imparted into an aircraft landing gear during an abnormal loading event (such as a hard landing or off-runway excursion), in order to determine whether the landing gear is still usable after such an event. If the vertical and drag loads in the axles of the landing gear can be known, these can be combined with side load and shock absorber closure to determine the loads in each major landing gear component.

Current installations are based on traditional sensors (e.g. strain gauges), and are limited to flight test use or have performance limitations. Robust installations are difficult to achieve inside an axle due to the mounting requirements (e.g. accuracy of positioning, orientation, temperature, surface finish). Also, the life of such sensors can be limited, and replacement very difficult. Other than what is used for flight test aircraft, no in-service system for detecting an overload is currently known.

SUMMARY OF THE INVENTION

The present invention provides an aircraft landing gear comprising a fibre optic load sensor for monitoring load in a component of the landing gear.

BRIEF DESCRIPTION OF THE DRAWINGS

Embodiments of the invention will now be described with reference to the accompanying drawings, in which:

FIG. 1 is a cross-section through the axle of an aircraft landing gear; and

FIG. 2 is a view on arrow A in FIG. 1.

DETAILED DESCRIPTION OF EMBODIMENT(S)

An aircraft landing gear 1 shown in FIGS. 1 and 2 comprises a vertically extending main strut 2, and left and right axles 3,4 at the end of the main strut 2. Each axle is essentially a hollow tube that supports a wheel and brake assembly (not shown) on the outside, and systems equipment on the inside. A fibre optic load sensing system is shown in the left axle 3. A similar system is mounted inside the right axle 4 but is not shown in the figures.

When under vertical and/or drag load, the axle 3 will deflect. A fibre optic cable 5 is firmly clamped or bonded to the inside of the axle 3 with the fibre running lengthways parallel to the centreline 5 of the axle. The cable 5 is run back and forth at different 'clock' positions as shown in FIG. 2 to do the job of many individual parallel fibres.

When the axle 3 bends, the fibre 5 also bends in sympathy. Bragg Grating sensors written into the fibre reflect the signal light in a way that allows the interrogator to determine the change in radius of the fibre. This change in geometry can be equated to the load that caused the deflection. As the fibre is run at different 'clock' locations around the inside of the axle, the direction of bend can be determined, and thus the load direction, which can be separated out into vertical and drag components.

The output of the load sensing system is recorded via a remote control and recorder unit (not shown).

Measurements are taken corresponding to each wheel location, therefore the load apportionment and total load can be established for the wheel group. This is an improvement on known existing systems, which are unable to determine individual wheel loads or separate out the drag loads from the vertical loads. The sensors can be arranged to measure both axes using either individual fibres, or a common fibre 5 as shown in FIGS. 1 and 2.

This information is useful in many respects, including for establishing the weight and balance of the aircraft, forward/aft centre-of-gravity location, loads introduced into the landing gear during normal operation, and loads introduced into the landing gear during abnormal loading events. The information can be used to optimise the gear design, and as an aid to establish if the acceptable loads have been exceeded.

Although a fibre optic cable can be written with many Bragg Grating sensors, it is possible to utilise a standard cable without Bragg Gratings. Once the characteristics of the cable core are mapped, the returned signal light can be read as if any part of the core is a Bragg Grating.

Although the invention has been described above with reference to one or more preferred embodiments, it will be appreciated that various changes or modifications may be made without departing from the scope of the invention as defined in the appended claims.

The invention claimed is:

1. An aircraft landing gear comprising a fibre optic load sensor for monitoring load in a component of the landing gear, said component having an axis, said load sensor comprising:
   a single fiber optic cable, said cable having at least first and second portions, each of said portions fixed to a surface of said component on opposite sides of said component in a direction substantially parallel with the axis of said component, each of said portions including a bragg grating sensor;
   a light source for directing light into one end of said fiber optic cable; and
   at least one interrogator connected to said cable and configured to read light reflected by said bragg grating sensors.

2. The gear of claim 1 wherein the component of the landing gear is an axle.

3. The gear of claim 1 wherein the fibre optic load sensor is mounted on an inner surface of the component of the landing gear.

4. A method of monitoring load in a component of a landing gear, said component having an axis, the method comprising the steps of:
   providing a fiber optic load sensor including a single fiber optic cable;
   locating said cable on one surface of said component, said cable including a first portion extending in a direction substantially parallel with said axis of said component and then said cable passing to an opposite surface of said component and a second portion returning in a direction substantially parallel with said axis and each of said first and second portions including a bragg grating sensor;
   providing light to one end of said cable; and monitoring variations in light reflected by said bragg grating sensors to determine the load on said component with said fibre optic load sensor.

5. The gear of claim 2 wherein said axle extends in a direction mutually perpendicular to load and drag forces on said landing gear.

6. An aircraft landing gear comprising a fibre optic load sensor for monitoring load in an axle of the landing gear, said axle extending in a direction mutually perpendicular to load and drag forces on said axle, said load sensor comprising:

a single fiber optic cable, said cable having first, second, third and fourth portions, each of said portions fixed to an internal surface of said axle at 0, 90, 180 and 270 degree positions around said internal surface and each of said portions extending in a direction substantially parallel with the axis of said axle, each of said portions including a bragg grating sensor;

a light source for directing light into one end of said cable; and at least one interrogator connected to said cable and configured to monitor variations of light reflected by said bragg grating sensors.

7. The gear of claim 6 wherein said load is measured in a vertical direction and drag is measured in a horizontal direction, with a first portion of said cable mounted on the relatively lowest internal surface, a second portion of said cable mounted on the relatively highest internal surface, a third portion of said cable is mounted on a relatively forwardmost internal surface and a fourth portions of said cable is mounted on a relatively rearwardmost internal surface.

8. An aircraft landing gear comprising a fibre optic load sensor for monitoring load in a component of the landing gear, said component having a longitudinal axis, wherein the fibre optic load sensor comprises a fibre optic cable which is run back and forth between different locations on said longitudinal axis, and wherein the fibre optic sensor is arranged to determine a direction of bend of the component, and thus the direction of the load on the component, which load can be separated out into vertical and drag components.

* * * * *